C. J. LUTHER.
DRIVE CHAIN.
APPLICATION FILED JULY 17, 1911.

1,173,670.

Patented Feb. 29, 1916.

WITNESSES:
Rene' Bruine
Fred. White

INVENTOR:
Charles J. Luther,
By Attorneys,
Fraser, Turk & Miller

THE COLUMBIA PLANOGRAPH CO., WASHINGTON, D. C.

UNITED STATES PATENT OFFICE.

CHARLES J. LUTHER, OF ELIZABETH, NEW JERSEY, ASSIGNOR OF ONE-HALF TO FRANCIS E. KNOWLES, OF SOUTH ORANGE, NEW JERSEY.

DRIVE-CHAIN.

1,173,670.　　　　　　　Specification of Letters Patent.　　Patented Feb. 29, 1916.

Original application filed September 21, 1910, Serial No. 582,972. Divided and this application filed July 17, 1911. Serial No. 638,899.

*To all whom it may concern:*

Be it known that I, CHARLES J. LUTHER, a citizen of the United States, residing in Elizabeth, in the county of Union and State of New Jersey, have invented certain new and useful Improvements in Drive-Chains, of which the following is a specification.

This application is in part a division of my application filed September 21, 1910, Serial No. 582,972.

The object of the present invention is to provide a chain which is especially adapted for use in conveyers or elevators wherein a bucket or other member is attached to the chain.

According to the invention the links of the chain, or a certain proportion thereof which are designed to be connected with the buckets, are provided with recesses preferably on the sides opposite those on which the buckets are attached, such recesses being designed to receive nuts of bolts passing through the links and buckets.

The invention also includes certain other features of construction which will be hereinafter pointed out.

Figure 1:
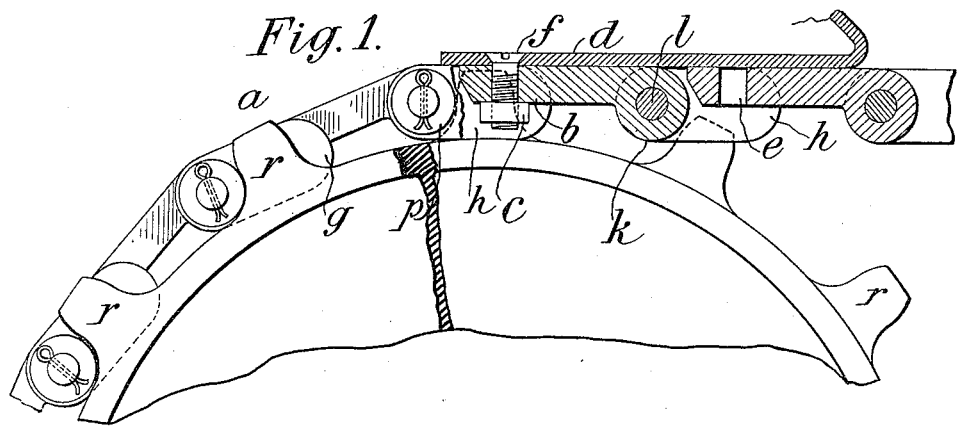
Figure 2:
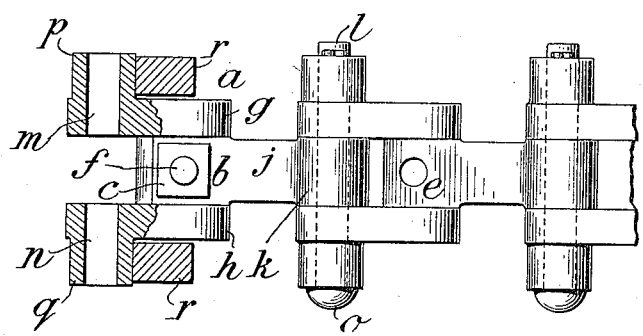
Figure 3:
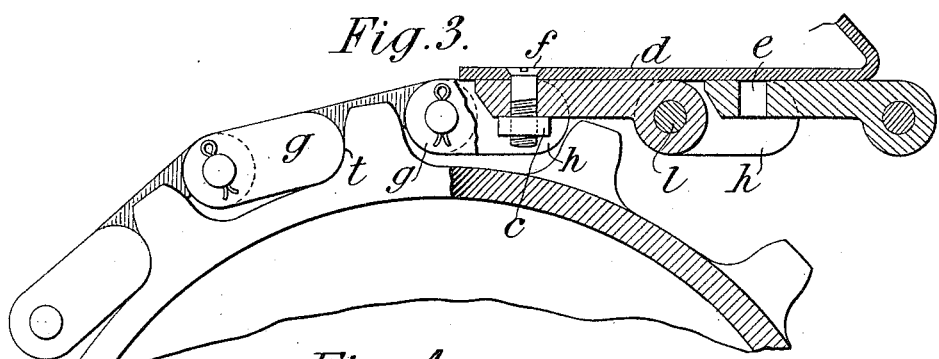
Figure 4:
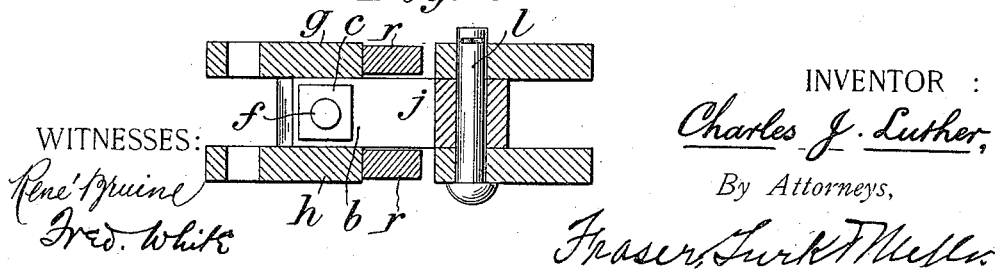

Referring to the drawings, illustrating my invention,—Figure 1 is an elevation of sprocket showing one form of my improved chain in connection therewith, certain of the parts being shown in central section. Fig. 2 is an under side view of the chain shown in Fig. 1, one of the links being shown as partly broken away. Fig. 3 is a view similar to Fig. 1, showing another form of the invention. Fig. 4 is an under side view of the form of chain shown in Fig. 3, partly in section.

Referring first to Figs. 1 and 2, let $a$ indicate the body of the link which may be of any suitable form, and which is provided on its under side with a recess $b$. This recess, as shown, is designed to receive a fastening device $c$ such as a nut or the head of a bolt which passes through the link and an elevator bucket or other member $d$ which is designed to be attached to the link. For this purpose the link is also preferably provided with an aperture or hole $e$ through which the screw bolt $f$ shown in the drawing is designed to pass. In the form shown in Figs. 1 and 2 the link is provided with side members $g$ $h$ and a shank portion $j$, the side members extending below the shank portion and constituting between them the recess $b$. The link is also shown as provided with an enlarged circular portion $k$ formed at the rear of the link and designed to receive a pivot $l$, or other means of connection with an adjacent link. At the front of the link the arms $g$ $h$ are shown as formed with holes $m$ $n$ through which the next succeeding pivot pin passes. Any suitable pin may be provided, but I have shown the pin comprising a bolt which is headed at one end at $o$ and at the other end provided with a passage or hole through which a cotter pin or other fastening device may be passed.

In the form shown in Figs. 1 and 2 I have shown the arms $g$ as provided with integral extensions $p$ $q$ which are rounded and are adapted to constitute driving projections which are engaged by the teeth $r$ of the sprocket wheel. The latter is preferably of the double type having two sets of teeth as shown.

By the construction thus described the nut of the bolt or other fastening device may be brought within the lower face of the link and thus prevented from coming in contact with the sprocket wheel. The link also presents a smooth under surface so that it is not liable to injure any other part with which it may come in contact. Furthermore, the end of the bolt and nut are protected, so that they are themselves not subject to accidental injury. Another feature of importance is that means are thus provided for holding the nut against rotation so that it cannot screw off the bolt in use. For this purpose the recess and nut are so proportioned that a portion of the nut is adapted to engage the side walls of the recess. The elevator bucket or similar device $d$ is preferably provided with a countersunk hole which receives the head of the bolt, the latter being preferably slotted to enable the bolt to be conveniently rotated to connect the parts.

In the construction illustrated in Figs. 3 and 4 the driving projections $p$ are omitted, the sprocket in this case being adapted to engage the rear faces $t$ of the arms $g$ $h$, these faces being preferably rounded as shown.

In the constructions shown the link on its upper surface is free from projections and constitutes a substantially flat surface for engagement with the bucket *d*. This construction is preferred, although it may be varied if desired.

Other modifications may be adopted without departing from the spirit of the invention.

What I claim is:—

1. A side drive chain link having a central web portion or shank constituting the tension member of the link, lateral portions extending from each side of said central web portion and projecting lengthwise beyond said web portion at one end, said side portions being of greater thickness or depth than said web portion, the space between said side portions and under the web constituting a recess for a nut or other fastening means used in fastening buckets or the like to said link.

2. A side drive chain link having a central web portion or shank constituting the tension member of the link, lateral portions extending from each side of said central web portion and projecting lengthwise beyond said web portion at one end, said side portions being of greater thickness or depth than said web portion, the space between said side portions and under the web constituting a recess for a nut or other fastening means used in fastening buckets or the like to said link, said side portions having shoulders thereon adapted to contact with the teeth of a drive wheel.

3. A side drive chain link having a central web portion or shank constituting the tension member of the link, lateral portions extending from each side of said central web portion and projecting lengthwise beyond said web portion at one end, said side portions being of greater thickness or depth than said web portion, the space between said side portions and under the web constituting a recess for a nut or other fastening means used in fastening buckets or the like to said link, said side portions having laterally projecting shoulders thereon adapted to contact with the teeth of a drive wheel.

4. A side drive chain link having a central web portion or shank *j*, constituting the tension member of the link, lateral portions *g* and *h* extending from each side of said central web portion and projecting lengthwise beyond said web portion at one end, said side portions being of greater thickness or depth than said web portion, the space between said side portions and under the web constituting a recess *b* for a nut or other fastening means used in fastening buckets or the like to said link, said side portions having shoulders thereon adapted to contact with the teeth of a drive wheel, said shank also having an end connection portion *k*, the end portion *k* and the side portions *g* and *h* being of substantially the same thickness.

In witness whereof I have hereunto signed my name in the presence of two subscribing witnesses.

CHARLES J. LUTHER.

Witnesses:
AUGUSTUS M. FYDSTOR,
FLORENCE E. BATES.

Copies of this patent may be obtained for five cents each, by addressing the "Commissioner of Patents, Washington, D. C."